(12) United States Patent
Chen et al.

(10) Patent No.: US 9,143,450 B2
(45) Date of Patent: Sep. 22, 2015

(54) COMMUNICATION SYSTEM AND METHOD FOR ASSISTING WITH THE TRANSMISSION OF TCP PACKETS

(71) Applicant: INDUSTRIAL TECHNOLOGY RESEARCH INSTITUTE, Hsinchu (TW)

(72) Inventors: Shi-Yang Chen, Taipei (TW); Yi-Ting Wang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 341 days.

(21) Appl. No.: 13/727,484

(22) Filed: Dec. 26, 2012

(65) Prior Publication Data
US 2013/0170358 A1   Jul. 4, 2013

(30) Foreign Application Priority Data
Dec. 30, 2011  (TW) .............................. 100149765 A

(51) Int. Cl.
*H04L 12/56* (2006.01)
*H04L 12/801* (2013.01)
*H04L 12/841* (2013.01)
*H04L 12/823* (2013.01)

(52) U.S. Cl.
CPC ............. *H04L 47/10* (2013.01); *H04L 47/283* (2013.01); *H04L 47/32* (2013.01); *H04L 47/11* (2013.01)

(58) Field of Classification Search
CPC ....... H04L 47/283; H04L 47/10; H04L 47/11; H04L 12/2692; H04L 12/569; H04L 67/28

USPC .......................................................... 370/237
See application file for complete search history.

(56) References Cited

U.S. PATENT DOCUMENTS

| 6,208,620 B1 | 3/2001 | Sen et al. |
| 6,993,584 B2 | 1/2006 | Border et al. |
| 7,006,480 B2 | 2/2006 | Border et al. |

(Continued)

FOREIGN PATENT DOCUMENTS

| CN | 1592299 | 3/2005 |
| CN | 101112063 | 1/2008 |

(Continued)

OTHER PUBLICATIONS

Taiwan Patent Office, Office Action, Patent Application Serial No. 100149765, Jan. 27, 2014, Taiwan.

(Continued)

*Primary Examiner* — Omar Ghowrwal
*Assistant Examiner* — Ellen A Kirillova

(57) ABSTRACT

A method for assisting with the transmission of TCP packets, which is used in a wireless communication system, including: receiving a plurality of TCP packets from a TCP packet sender and transmitting the TCP packets to a receiver proxy; transmitting a feedback packet to a sender proxy when receiving a TCP packet; calculating a round trip time (RTT) between the sender proxy and the receiver proxy when receiving the feedback packet, and comparing a RTT threshold and the RTT between the sender proxy and receiver proxy; determining whether a network between the sender proxy and the receiver proxy is in a congestion state according to the result of the comparison between the RTT threshold and the RTT; and dropping a TCP packet when the network is in the congestion state.

29 Claims, 16 Drawing Sheets

(56) References Cited

U.S. PATENT DOCUMENTS

| | | | |
|---|---|---|---|
| 7,082,102 B1 | 7/2006 | Wright | |
| 7,180,896 B1 * | 2/2007 | Okumura | 370/394 |
| 7,213,077 B2 | 5/2007 | Border | |
| 7,219,158 B2 | 5/2007 | Border et al. | |
| 7,389,533 B2 | 6/2008 | Bartlett et al. | |
| 7,398,552 B2 | 7/2008 | Pardee et al. | |
| 7,561,523 B1 * | 7/2009 | Revsin et al. | 370/236 |
| 7,586,899 B1 | 9/2009 | Mohaban et al. | |
| 7,596,802 B2 | 9/2009 | Border et al. | |
| 7,616,638 B2 | 11/2009 | Samuels et al. | |
| 7,616,644 B2 | 11/2009 | Chaskar et al. | |
| 7,630,305 B2 | 12/2009 | Samuels et al. | |
| 7,643,416 B2 | 1/2010 | Pardee et al. | |
| 7,656,799 B2 | 2/2010 | Samuels et al. | |
| 7,698,398 B1 | 4/2010 | Lai | |
| 7,698,453 B2 | 4/2010 | Samuels et al. | |
| 7,787,372 B2 | 8/2010 | Agarwal | |
| 7,831,693 B2 | 11/2010 | Lai | |
| 7,953,820 B2 | 5/2011 | Stevens et al. | |
| 2003/0007454 A1 * | 1/2003 | Shorey | 370/229 |
| 2003/0235206 A1 | 12/2003 | Heller | |
| 2005/0002410 A1 * | 1/2005 | Chao et al. | 370/412 |
| 2005/0232147 A1 | 10/2005 | Bang et al. | |
| 2006/0039287 A1 * | 2/2006 | Hasegawa et al. | 370/238 |
| 2007/0064716 A1 * | 3/2007 | Sachs et al. | 370/412 |
| 2008/0192636 A1 | 8/2008 | Briscoe et al. | |
| 2009/0154356 A1 * | 6/2009 | Wiemann et al. | 370/236 |
| 2010/0203905 A1 * | 8/2010 | Chaubey et al. | 455/458 |
| 2010/0302986 A1 * | 12/2010 | Kim et al. | 370/312 |
| 2011/0055390 A1 * | 3/2011 | Malloy et al. | 709/224 |
| 2013/0170342 A1 * | 7/2013 | Alnuem | 370/230 |

FOREIGN PATENT DOCUMENTS

| | | |
|---|---|---|
| EP | 2296313 A1 * | 3/2011 |
| TW | 200423635 | 11/2004 |
| TW | 1246283 | 12/2005 |
| TW | 200620890 | 6/2006 |
| TW | 200623720 | 7/2006 |
| TW | 200727630 | 7/2007 |
| TW | 200729841 | 8/2007 |
| TW | 1308012 | 3/2009 |
| TW | 322598 | 3/2010 |
| TW | 201112683 | 4/2011 |
| TW | 201146036 | 12/2011 |
| WO | WO 03043285 | 5/2003 |
| WO | WO 03092239 | 11/2003 |

OTHER PUBLICATIONS

D. Murray et al., "D-Proxy: Reliability in Wireless Networks," 16th Asia-Pacific Conference on Communications (APCC), Oct. 2010, pp. 129-134, IEEE, US.

D. Oliverira et al., "A Proxy-based Architecture for TCP to Mitigate Packet Loss on Wireless Networks," IFIP/IEEE Wireess Daus (WD), Dec. 2009, 6 pages, IEEE, US.

M. Ivanovich et al., "On TCP Performance Enhancing Proxies in a Wireless Environment," IEEE Communications Magazine, Sep. 2008, pp. 76-83, vol. 46, No. 9. IEEE, US.

Y. Zhang et al., "Design and Implementation of a TCP Performance Enhancement Gateway for Satellite Networks," International Conference on Communications and Intelligence Informations Security, 2010, pp. 252-255, IEEE, US.

S. Philopoulos et al., "Proxy-based Connection-Splitting Architectures for Improving TCP Performance over Satellite Channels," IEEE Canadian Conference on Electrical and Computer Engineering (CCECE), Aug. 2002, pp. 1430-1435, IEEE, US.

J. Shen et al. "A Performance Enhancing Proxy for Terrestrial-Satellite Hybrid Networks," IEEE International Conference on Communications, Circuits and Systems (ICCCAS) May 2008, pp. 529-533, IEEE, US.

L. Wu et al., "Dynamic Congestion Control to Improve Performance of TCP Split-Connections over Satellite Links," IEEE International Conference on Computer Communications and Networks (ICCCN), Oct. 2004, pp. 268-272, IEEE, US.

M. Allman et al., "TCP Congestion Control", IETF RFC2581: Request for Comments-Standards Track, Apr. 1999, pp. 1-14, The Internet Society, US.

V. Jacobson et al., "Congestion Avoidance and Control", ACM SIGCOMM Computer Communication Review (CCR), Nov. 1988, pp. 1-25, vol. 18, No. 4, US.

C. Chiu et al., "Analysis of the Increase and Decrease Algorithms for Congestion Avoidance in Computer Networks," Ellsevier Journal of Computer Networks and ISDN, Jun. 1989, pp. 1-14, Elsevier Science Publishers B.V., US.

K.. Fall et al., "Simulation-based Comparison of Tahoe, Reno, and SACK TCP," ACM SIGCOMM Computer Communication Review (CCR), Jul. 1996, 17 pages, vol. 26, No. 3, , US.

G. Buchholcz et al., "TCP-ELN: On the Protocol Aspects and Performance of Explicit Loss Notification for TCP over Wireless Networks," IEEE International Conference on Wireless Internet (WICON), Jul. 2005, 8 pages, IEEE, US.

C. Casetti et al., "TCP Westwood: End-to-End Congestion Control for Wired/Wireless Networks," ACM Journal on Wireless Networks (JWN), vol. 8, No. 5, Sep. 2002, pp. 467-479, Kluwer Academic Publishers, The Netherlands.

K. Xu et al., "TCP-Jersey for Wireless IP Communications," IEEE Journal on Selected Areas in Communications (JSAC), May 2004, pp. 747-756, vol. 22, No. 4, IEEE, US.

L. Brakmo et al., "TCP Vegas: End to End Congestion Avoidance on a Global Internet," IEEE Journal on Sected Areas in Communications (JSAC), Oct. 1995, pp. 1465-1480, vol. 13, No. 8, IEEE, US.

C.-P. Fu et al., "TCP Veno: TCP Enhancement for Transmission Over Wireless Access Networks," IEEE Journal on Selected Areas in Communications (JSAC), Feb. 2003, pp. 216-228, vol. 21, No. 2, IEEE, US.

I.F. Akyildiz et al., "TCP-Peach: A New Congestion Control Scheme for Satellite IP Networks," IEEE/ACM Transactions on Networking (TON), Jun. 2001, pp. 307-321, vol. 9, No. 3, IEEE, US.

S. Biaz et al., "De-Randomizing Congestion Losses to Improve TCP Performance Over Wired-Wireless Networks," IEEE/ACM Transactions on Networking (TON), Jun. 2005, pp. 596-608, vol. 13, No. 3, IEEE, US.

E. H.-K Wu et al., "JTCP: Jitter-Based TCP for Heterogeneous Wireless Networks," IEEE Journal on Selceted Areas in Communications (JSAC), May 2004, pp. 757-766, vol. 22, No. 4, IEEE, US.

T. Milan et al., "Efficiency Study of TCP Protocols in Infrastructured Wireless Networks," IEEE International Conference on Networking and Services (ICNS), Jul. 2006, 6 pages, IEEE, US.

J. Martin et al., "Delay-Based Congestion Avoidance for TCP," IEEE/ACM Transactions on Networking (TON), Jun. 2003, 356-369, vol. 11, No. 3, IEEE, US.

P. Anelli et al., "Transport Congestion Events Detection (TCED): Towards Decorrelating Congestion Detection from TCP," ACM SIGAPP Syposium on Applied Computing (SAC), Mar. 2010, pp. 663-669, Switzerland.

A. Bakre et al., "I-TCP: Indirect TCP for Mobile Hosts," IEEE International Conference on Distributed Computing Systems (iDCS), May 1995, pp. 136-143, IEEE, US.

M. Lugliio et al., "On-Board Satellite "Split TCP" Proxy," IEEE Journal on Selected Areas in Communications (JSAC), Feb. 2004, pp. 362-370, vol. 22, No. 2, IEEE, US.

J. Liu et al., "ATCP: TCP for Mobile Ad Hoc Networks," IEEE Journal on Selected Areas in Communications (JSAC), Jul. 2001, pp. 1300-1315, vol. 19, No. 7, IEEE, US.

H. Balakrishnan et al., "A Comparison of Mechanisms for Improving TCP Performance over Wireless Links," IEEE/ACM Transaction on Networking (TON), Dec. 1997, pp. 756-769, vol. 6, No. 5, IEEE, US.

N. Vaidyal et al., "Delayed Duplicate Acknowledgements: A TCP-Unaware Approach to Improve Performance of TCP Over Wireless," WILEY Journal on Wireless Communications and Mobile Computing, Feb. 2002, pp. 1-16, vol. 2, No. 1, John Wiley & Sons, Ltd., US.

(56) References Cited

OTHER PUBLICATIONS

H. Balakrishnan et al., "Improving Reliable Transport and Handoff Performance in Cellular Wireless Networks," ACM Mobile Computing and Networking Conference (Mobicom), Nov. 1995, pp. 469-481, Wireless Networks 1, US.

M. Mathis et al., "The Macroscopic Behavior of the TCP Congestion Avoidance Algorithm," ACM SIGCOMM Computer Communication Review (CCR), Jul. 1997, pp. 67-82, vol. 27, No. 3, US.
China Patent Office, Office Action, Patent Application Serial No. 201210183055.1, Jan. 4, 2015, China.

* cited by examiner

COMMUNICATION SYSTEM AND METHOD FOR ASSISTING WITH THE TRANSMISSION OF TCP PACKETS

CROSS REFERENCE TO RELATED APPLICATIONS

The present application is based on, and claims priority from, Taiwan (International) Application Serial Number 100149765, filed on Dec. 30, 2011, the disclosure of which is hereby incorporated by reference herein in its entirety.

TECHNICAL FIELD

The present disclosure relates to a communication network, and in particular relates to a system and a method for assisting with the transmission of TCP packets in the communication network.

BACKGROUND

With the large amounts of data transmission requirement among mobile network communication equipments has been increased quickly, the network devices in the traditional mobile voice communication networks have evolved to use data packets to communicate with the other network devices. The data packet communication can provide user IP telephony, messaging, video and multimedia streaming, multicast conferencing, and on-demand services for the mobile communication equipments.

Transmission control protocol (TCP) used in a wireless network can cause a misjudgment. For example, in the TCP packet transmission procedure, if a lost packet is not caused by the network congestion (such as signal fading or handoff process), according to the TCP mechanism, Additive Increase and Multiplicative Decrease (AIMD) or Slow Start will still be used to control its transmission rate into the network, wherein AIMD and Slow Start limit the transmission rate corresponding to different network congestion levels, respectively. However, when the wireless network is not in the congestion state, reducing the transmission rate can make the total network utilization and efficiency lower. Therefore, a solution is necessary for the problems that low utilization and efficiency of wireless link is due to TCP misjudging the congestion state in the wireless network.

SUMMARY

A detailed description is given in the following embodiments with reference to the accompanying drawings.

Communication systems and methods for assisting with the transmission of TCP packets are provided.

In one exemplary embodiment, the disclosure is directed to a communication system, which is used in a wireless communication link, comprising: a receiver proxy; and a sender proxy, configured to: receive a plurality of TCP packets from a TCP packet sender, and transmit the TCP packets to the receiver proxy; calculate a round trip time (RTT) between the sender proxy and the receiver proxy when receiving a feedback packet from the receiver proxy, and compare a RTT threshold and the RTT between the sender proxy and the receiver proxy; determine that a TCP packet is lost according to the feedback packet; determine whether a network between the sender proxy and the receiver proxy is in a congestion state according to the result of the comparison between the RTT threshold and the RTT; drop a TCP packet when the network is in the congestion state; retransmit a lost TCP packet to the receiver proxy when the network is not in the congestion state; wherein the receiver proxy, is configured: to receive the TCP packets from the sender proxy, and transmit the reordered TCP packets to a TCP packet receiver; transmit a feedback packet to the sender proxy after receiving a TCP packet; receive an indication of drop from the sender proxy, and transmit the received TCP packet to the TCP packet receiver; the sender proxy and the receiver proxy are configured between the TCP packet sender and the TCP packet receiver.

In one exemplary embodiment, the disclosure is directed to a communication system, which is used in a wireless communication link, comprising: a TCP packet sender; and a sender proxy, configured to: receive a plurality of TCP packets from the TCP packet sender, and transmit the TCP packets to a receiver proxy; calculate a round trip time (RTT) between the sender proxy and the receiver proxy when receiving a feedback packet from the receiver proxy, and compare a RTT threshold and the RTT between the sender proxy and the receiver proxy; determine that a TCP packet is lost according to the feedback packet; determine whether a network between the sender proxy and the receiver proxy is in a congestion state according to the result of the comparison between the RTT threshold and the RTT; drop a TCP packet when the network is in the congestion state, and transmit an indication of drop to inform the receiver proxy that the receiver proxy does not need to wait for the dropped TCP packet to be retransmitted from the sender proxy; retransmit a lost TCP packet to the receiver proxy when the network is not in the congestion state; wherein the sender proxy and the receiver proxy are configured between the TCP packet sender and a TCP packet receiver.

In one exemplary embodiment, the disclosure is directed to a communication system, which is used in a wireless communication link, comprising: a TCP packet receiver; and a receiver proxy, configured to: receive a plurality of TCP packets from a sender proxy, and transmit the reordered TCP packets to the TCP packet receiver; transmit a feedback packet to the sender proxy when receiving a TCP packet; receive an indication of drop, indicating that the sender proxy has dropped a TCP packet, and transmit the received TCP packets to the TCP packet receiver; wherein the indication of drop is used to inform the receiver proxy that the receiver proxy does not need to wait for the dropped TCP packet to be retransmitted from the sender proxy; the sender proxy and the receiver proxy are configured between the TCP packet sender and the TCP packet receiver.

In one exemplary embodiment, the disclosure is directed to a method for assisting with the transmission of TCP packets, which is used in a wireless communication link, comprising: receiving a plurality of TCP packets from a TCP packet sender, and transmitting the TCP packets to a receiver proxy; transmitting a feedback packet to a sender proxy when receiving a TCP packet, and transmitting the reordered TCP packets to a TCP packet receiver; calculating a round trip time (RTT) between the sender proxy and the receiver proxy when receiving the feedback packet, and comparing a RTT threshold and the RTT between the sender proxy and receiver proxy; determine that a TCP packet is lost according to the feedback packet; determining whether a network between the sender proxy and the receiver proxy is in a congestion state according to the result of the comparison between the RTT threshold and the RTT; dropping a TCP packet when the network is in the congestion state, and transmitting an indication of drop to the receiver proxy; retransmitting a lost TCP packet to the receiver proxy when the network is not in the congestion state.

In one exemplary embodiment, the disclosure is directed to a method for assisting with the transmission of TCP packets, which is used in a wireless communication link, comprising: receiving a plurality of TCP packets from a TCP packet sender, and transmitting the TCP packets to a receiver proxy; calculating a round trip time (RTT) between the sender proxy and the receiver proxy when receiving a feedback packet from the receiver proxy, and comparing a RTT threshold and the RTT between the sender proxy and receiver proxy; determine that a TCP packet is lost according to the feedback packet; determining whether a network between the sender proxy and the receiver proxy is in a congestion state according to the result of the comparison between the RTT threshold and the RTT; dropping a TCP packet when the network is in the congestion state, and transmitting an indication of drop to the receiver proxy; retransmitting a lost TCP packet to the receiver proxy when the network is not in the congestion state.

In one exemplary embodiment, the disclosure is directed to a method for assisting with the transmission of TCP packets, which is used in a wireless communication system, comprising: receiving a plurality of TCP packets from a sender proxy, and transmitting the reordered TCP packet to a TCP packet receiver; transmitting a feedback packet to the sender proxy when receiving a TCP packet; receiving an indication of drop, indicating that the sender proxy has dropped a TCP packet, wherein the indication of drop is used to inform a receiver proxy that the receiver proxy does not need to wait for the dropped TCP packet to be retransmitted from the sender proxy, and transmitting the received TCP packets to the TCP packet receiver.

DRAWINGS

The present disclosure can be more fully understood by reading the subsequent detailed description and examples with references made to the accompanying drawings, wherein.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1A:
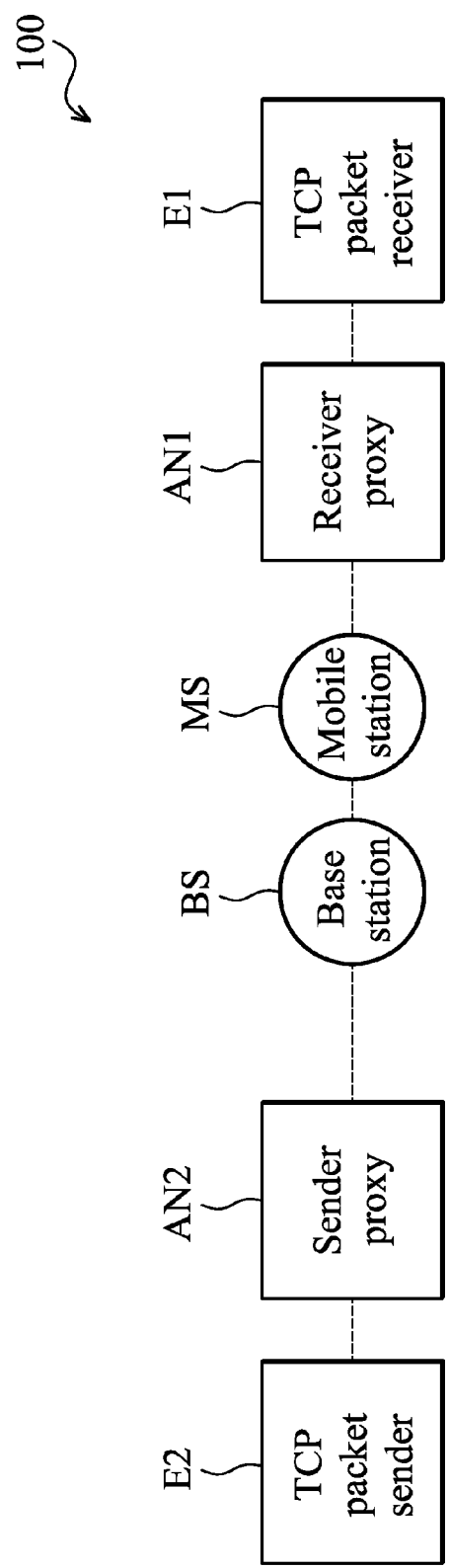
FIGS. 1a and 1b are schematic diagrams illustrating the communication system according to an embodiment of the present disclosure.

FIG. 1a is a schematic diagram illustrating the communication system according to an embodiment of the present disclosure. The communication system 100 comprises a TCP packet receiver E1, a TCP packet sender E2, a receiver proxy AN1, a sender proxy AN2, a base station BS and a mobile station MS.

For example, the TCP packet receiver E1 and the TCP packet sender E2 can be electronic devices which have the ability to connect to networks, such as personal computers, notebooks or laptop computers, handheld devices and electronic devices which can be connected to a wireless network. The receiver proxy AN1 and the sender proxy AN2 are set between the TCP packet receiver E1 and the TCP packet sender E2. The base station BS and the mobile station MS set between the receiver proxy AN1 and the sender proxy AN2 are configured to send the TCP packets. The receiver proxy AN1 and the sender proxy AN2 can be software which is installed in the proxy. The receiver proxy AN1 and the sender proxy AN2 can also be hardware.

Figure 2:
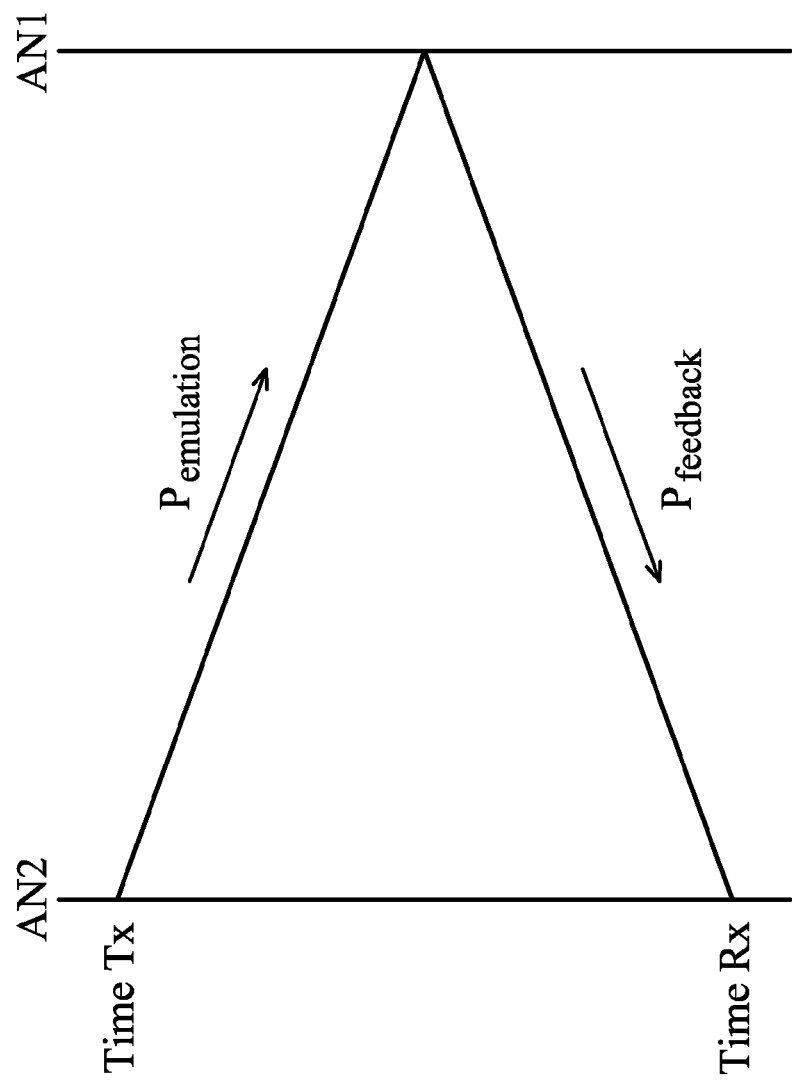
FIG. 2 is a schematic diagram illustrating the method for measuring a round trip time.

At first, the receiver proxy AN1 and the sender proxy AN2 measure a round trip time (RTT) between the receiver proxy AN1 and the sender proxy AN2. The RTT is used to calculate a link delay (LD) between the receiver proxy AN1 and the sender proxy AN2, wherein the calculation of the link delay assumes that a packet queue delay (QD) is 0 when the receiver proxy AN1 and the sender proxy AN2 measure the RTT. As shown in FIG. 2, the sender proxy AN2 sends an emulation packet $P_{emulation}$ at time $T_x$ to the receiver proxy AN1. When the receiver proxy AN1 receives the emulation packet $P_{emulation}$ from the sender proxy AN2, the receiver proxy AN1 sends a feedback packet $P_{feedback}$ to the sender proxy AN2. The sender proxy AN2 receives the feedback packet $P_{feedback}$ at time $R_x$, and calculates the link delay according to $(R_x - T_x)/2$. A RTT threshold is a multiple of the link delay. In the embodiment, the RTT threshold is four times that of the link delay. In one embodiment, a serial number in the emulation packet $P_{emulation}$, and the corresponding feedback packet $P_{feedback}$ has the serial number. The sender proxy AN2 can calculate the RTT between the receiver proxy AN1 and the sender proxy AN2 according to the difference between an arrival time of the feedback packet $P_{feedback}$ and a sending time of the emulation packet $P_{emulation}$. In one embodiment, a timestamp in the emulation packet $P_{emulation}$, and the corresponding feedback packet $P_{feedback}$ has the timestamp. The sender proxy AN2 can calculate the RTT between the receiver proxy AN1 and the sender proxy AN2 according to the timestamp difference between the arrival time of the feedback packet $P_{feedback}$ and the sending time of the emulation packet $P_{emulation}$. When the sender proxy AN2 receives the TCP packet from the TCP packet sender E2, the sender proxy AN2 multiplexes the TCP packet and sends the TCP packet to the receiver proxy AN1.

After the receiver proxy AN1 receives the TCP packet sent from the sender proxy AN2, the receiver proxy AN1 sends the feedback packet to the sender proxy AN2. The sender proxy AN2 can calculate the RTT between the receiver proxy AN1 and the sender proxy AN2, i.e. the RTT is calculated according to the timestamp difference between the arrival time of the feedback packet and the sending time of the emulation packet. When the receiver proxy AN1 receives discontinuous TCP packets, the sender proxy AN2 receives a lost message that indicates that a TCP packet was lost according to the feedback packet. Then, the sender proxy AN2 compares the RTT with the RTT threshold.

For example, the method for detecting the lost TCP packet can be that the receiver proxy AN1 transmits the same feedback packet to the sender proxy AN2, wherein the same feedback packet has an acknowledgement (ACK). For example, the acknowledgement process performed by the receiver proxy AN1 may include the following steps:

the serial number 1 is 'arrived', the acknowledgement 1 is 'feedback'
the serial number 2 is 'arrived', the acknowledgement 2 is 'feedback'
the serial number 3 is 'arrived', the acknowledgement 3 is 'feedback'
the serial number 5 is 'arrived', the acknowledgement 5 is 'feedback'
the serial number 6 is 'arrived', the acknowledgement 6 is 'feedback'
the serial number 8 is 'arrived', the acknowledgement 8 is 'feedback'
. . .

When acknowledgement 5 (or the number which is greater than 5) is 'arrived' at the sender proxy AN2, the sender proxy AN2 can determine that the serial number 4 was lost because the sender proxy AN2 has not received the serial number 4. Similarly, when acknowledgement 8 is 'arrived' at the sender proxy AN2, the sender proxy AN2 can determine that the serial number 7 was lost.

For example, the method for detecting the lost TCP packet can be that the receiver proxy AN1 transmits the same feedback packet to the sender proxy AN2, wherein the same feedback packet has a negative acknowledgement (NACK). For example, the acknowledgement process performed by the receiver proxy AN1 may include the following steps:

the serial number 1 is 'arrived', the acknowledgement 0 is 'feedback'
the serial number 2 is 'arrived', the acknowledgement 0 is 'feedback'
the serial number 3 is 'arrived', the acknowledgement 0 is 'feedback'
the serial number 5 is 'arrived', the acknowledgement 4 is 'feedback'
the serial number 6 is 'arrived', the acknowledgement 4 is 'feedback'
the serial number 8 is 'arrived', the acknowledgement 7 is 'feedback'
. . .

When acknowledgement 4 repeatedly arrives at the sender proxy AN2, the sender proxy AN2 can determine that the serial number 4 was lost. Similarly, when acknowledgement 7 repeatedly arrives at the sender proxy AN2, the sender proxy AN2 can determine that the serial number 7 was lost.

For example, the method for detecting the lost TCP packet can be that the receiver proxy AN1 transmits the same feedback packet to the sender proxy AN2, wherein the same feedback packet has a cumulative acknowledgement (CACK). For example, the acknowledgement process performed by the receiver proxy AN1 may include the following steps:

the serial number 1 is 'arrived', the acknowledgement 1 is 'feedback'
the serial number 2 is 'arrived', the acknowledgement 2 is 'feedback'
the serial number 3 is 'arrived', the acknowledgement 3 is 'feedback'
the serial number 5 is 'arrived', the acknowledgement 3 is 'feedback'
the serial number 6 is 'arrived', the acknowledgement 3 is 'feedback'
the serial number 8 is 'arrived', the acknowledgement 3 is 'feedback'
. . .

When acknowledgement 3 repeatedly arrives at the sender proxy AN2, the sender proxy AN2 can determine that the serial number 4 was lost.

For example, the method for detecting the lost TCP packet can be that the receiver proxy AN1 transmits the same feedback packet to the sender proxy AN2, wherein the same feedback packet has a selective acknowledgement (SACK). For example, the acknowledgement process performed by the receiver proxy AN1 may include the following steps:

the serial number 1 is 'arrived', the acknowledgement 1, 1 is 'feedback'
the serial number 2 is 'arrived', the acknowledgement 1, 2 is 'feedback'
the serial number 3 is 'arrived', the acknowledgement 1, 3 is 'feedback'
the serial number 5 is 'arrived', the acknowledgement 1, 3; 5, 5 is 'feedback'
the serial number 6 is 'arrived', the acknowledgement 1, 3; 5, 6 is 'feedback'
the serial number 8 is 'arrived', the acknowledgement 1, 3; 5, 6; 8, 8 is 'feedback'
. . .

When acknowledgement 1, 3; or 5, 6 (6 or the number which is greater than 6) is 'arrived' at the sender proxy AN2, the sender proxy AN2 can determine that the serial number 4 was lost. Similarly, when acknowledgement 1, 3; 5, 6; or 8, 8 is 'arrived' at the sender proxy AN2, the sender proxy AN2 can determine that the serial number 7 was lost. The semicolons represent that the serial numbers are discontinuous numbers, and the commas represent that the serial numbers are consecutive numbers.

In one embodiment, when the RTT is greater than or equal to the RTT threshold (i.e., the RTT is greater than or equal to four times that of the link delay), the sender proxy AN2 determines that a network between the sender proxy AN2 and the receiver proxy AN1 is in a congestion state. Then, the sender proxy AN2 drops the TCP packet, and sends an indication of drop to inform the receiver proxy AN1 that the sender proxy AN2 has dropped a TCP packet. When the receiver proxy AN1 receives the indication of drop sent from the sender proxy AN2, the receiver proxy AN1 does not need to wait for the dropped TCP packet to be retransmitted from the sender proxy AN2.

In one embodiment, when the packet queue delay is greater than or equal to the threshold of the packet queue delay (i.e., the packet queue delay is greater than or equal to twice that of the link delay), the sender proxy AN2 determines that the network between the sender proxy AN2 and the receiver proxy AN1 is in the congestion state. Then, the sender proxy AN2 drops the TCP packet, and sends an indication of drop to inform the receiver proxy AN1 that the sender proxy AN2 drops the TCP packet. When the receiver proxy AN1 receives the indication of drop sent from the sender proxy AN2, the receiver proxy AN1 does not need to wait for the dropped TCP packet to be retransmitted from the sender proxy AN2, and sends the received TCP packets to the TCP packet receiver E1.

Because the sender proxy AN2 drops the TCP packet automatically and sends an indication of drop to inform the receiver proxy AN1 that the sender proxy AN2 drops the TCP packet, the TCP packet receiver E1 and the TCP packet sender E2 can detect the loss of a TCP packet. Therefore, the TCP packet sender E2 uses multiplicative decrease (MD) to control the transmission rate of the network.

When the receiver proxy AN1 receives discontinuous TCP packets, the sender proxy AN2 can determine that a TCP packet was lost according to the feedback packet. In one embodiment, when the RTT is smaller than the RTT threshold (i.e., the RTT is smaller than four times that of the link delay), the sender proxy AN2 determines that the network between the sender proxy AN2 and the receiver proxy AN1 is not in the congestion state. Next, the sender proxy AN2 retransmits the lost TCP packet at an original transmission rate. When the receiver proxy AN1 receives the lost TCP packet retransmitted from the sender proxy AN2, the receiver proxy AN1 reorders the received TCP packets. Then, the receiver proxy AN1 transmits the reordered TCP packets to the TCP packet receiver E1.

In one embodiment, when the packet queue delay is smaller than the threshold of the packet queue delay (i.e., the packet queue delay is smaller than twice that of the link delay), wherein the threshold of the packet queue delay is calculated according to the link delay between the receiver proxy and the sender proxy, the sender proxy AN2 determines that the network between the receiver proxy AN1 and the sender proxy AN2 is not in the congestion state. Next, the sender proxy AN2 retransmits the lost TCP packet at an original transmission rate. When the receiver proxy AN1 receives the lost TCP packet retransmitted from the sender proxy AN2, the receiver proxy AN1 reorders the received TCP packets. Then, the receiver proxy AN1 transmits the reordered TCP packets to the TCP packet receiver E1.

Because the lost TCP packet to be lost in the transmission process is transmitted by the sender proxy AN2, the TCP packet receiver E1 cannot determine whether the sender proxy AN2 retransmitted the lost TCP packet to the receiver proxy AN1. At this time, the TCP packet receiver E1 and the TCP packet sender E2 do not detect that a TCP packet was lost. Therefore, the TCP packet sender E2 uses additive increase (AI) to control the transmission rate of the network.

Figure 1B:
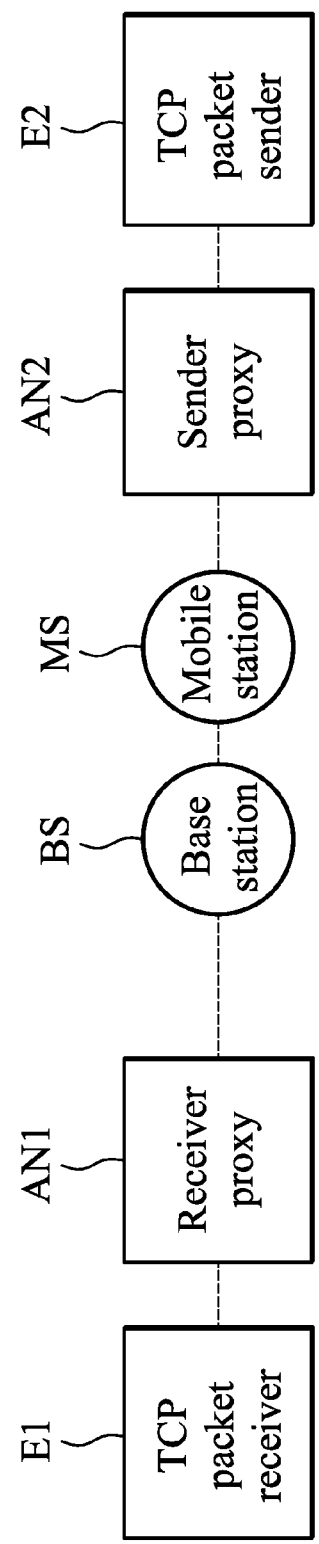

FIG. 1b is a schematic diagram illustrating the communication system according to an embodiment of the present disclosure. The direction of the transmission packets in FIG. 1b is an uplink direction, and the direction of the transmission packets in FIG. 1a is a downlink direction. The process in FIG. 1b is same as the process in FIG. 1a, so the details related to the process in FIG. 1b will be omitted.

Figure 3A:
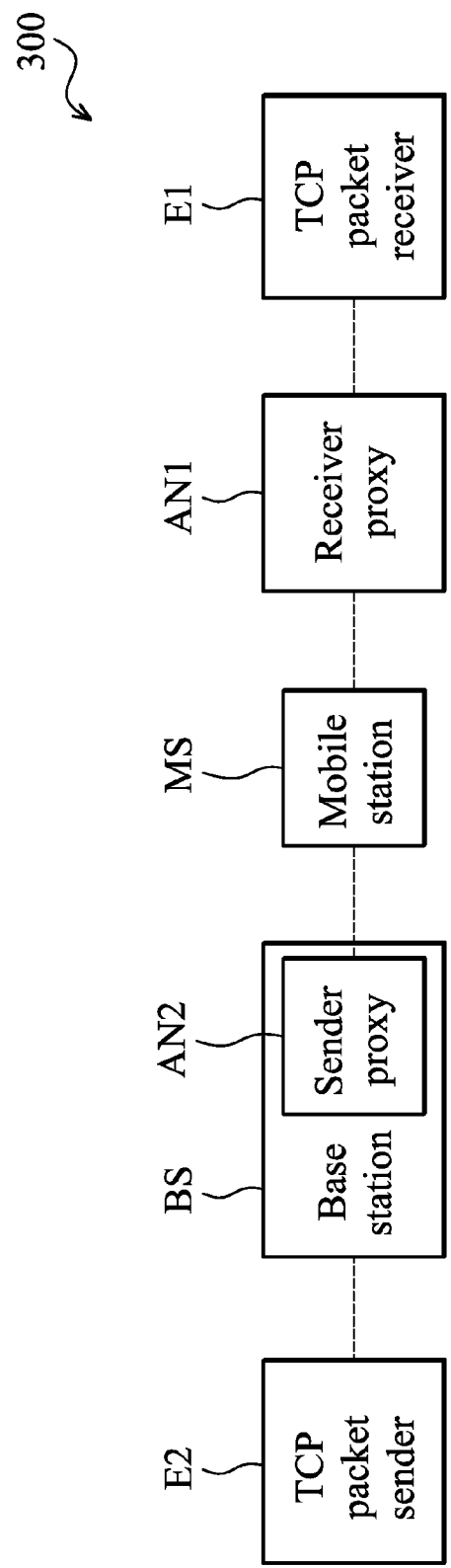
FIGS. 3a and 3b are schematic diagrams illustrating the communication system according to an embodiment of the present disclosure.

FIG. 3a is a schematic diagram illustrating the communication system according to an embodiment of the present disclosure. The communication system 300 comprises a TCP packet receiver E1, a TCP packet sender E2, a receiver proxy AN1, a base station BS and a mobile station MS.

The receiver proxy AN1 is set between the TCP packet receiver E1 and the TCP packet sender E2. The base station BS and the mobile station MS set between the receiver proxy AN1 and the TCP packet sender E2 are configured to transmit TCP packets. In the embodiment, the sender proxy AN2 in FIG. 1a is integrated into the base station BS. Therefore, the base station BS in FIG. 3a has the function of the sender proxy AN2 in FIG. 1a.

In one embodiment, the sender proxy AN2 can query the base station BS about the packet queue delay directly. When the packet queue delay is greater than or equal to twice that of the link delay, the sender proxy AN2 determines that the network between the receiver proxy AN1 and the sender proxy AN2 is in the congestion state. The next process is the same as the process described in FIG. 1a, so the details related to the process in FIG. 3a will be omitted.

Figure 3B:
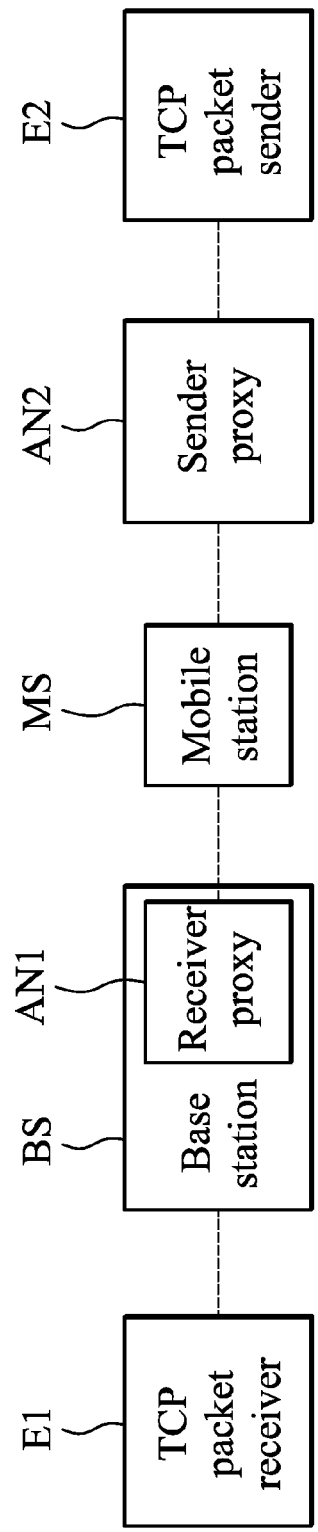

FIG. 3b is a schematic diagram illustrating the communication system according to an embodiment of the present disclosure. The direction of the transmission packets in FIG. 3b is an uplink direction, and the direction of the transmission packets in FIG. 3a is a downlink direction. The process in FIG. 3b is same as the process in FIG. 3a, so the details related to the process in FIG. 3b will be omitted.

Figure 4A:
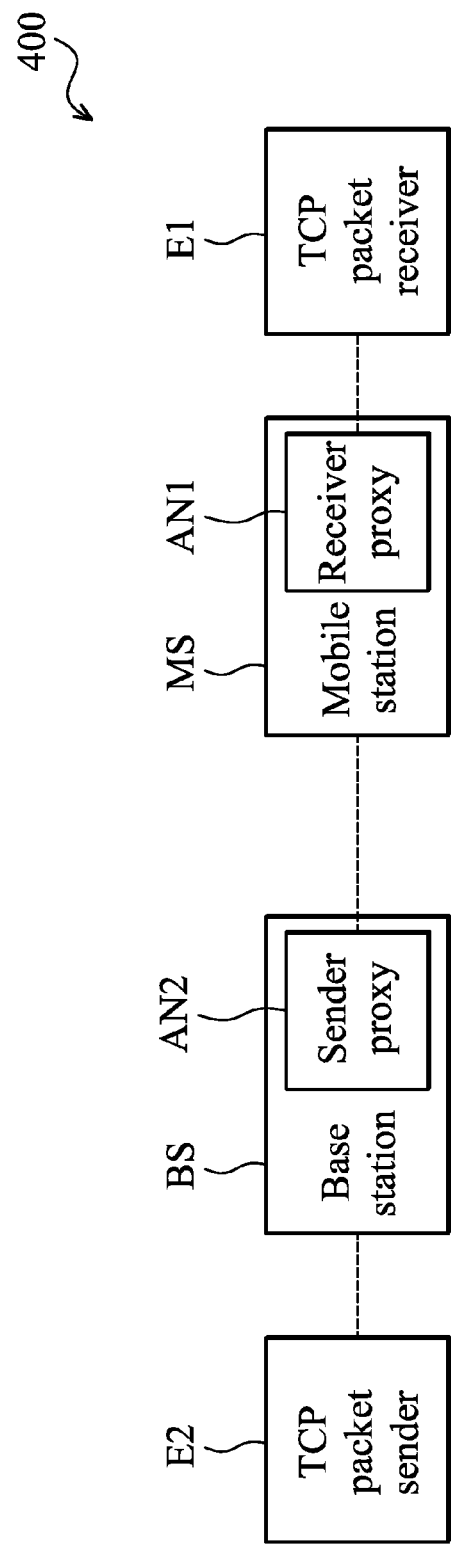
FIGS. 4a and 4b are schematic diagrams illustrating the communication system according to an embodiment of the present disclosure.

FIG. 4a is a schematic diagram illustrating the communication system according to an embodiment of the present disclosure. The communication system 400 comprises a TCP packet receiver E1, a TCP packet sender E2, a base station BS and a mobile station MS.

The base station BS and the mobile station MS set between the TCP packet receiver E1 and the TCP packet sender E2 are configured to transmit TCP packets. In the embodiment, the sender proxy AN2 in FIG. 1a is integrated into the base station BS, and the receiver proxy AN1 in FIG. 1a is integrated into the mobile station MS. Therefore, the base station BS in FIG. 4a has the function of the sender proxy AN2 in FIG. 1a, and the mobile station MS has the function of the receiver proxy AN1. The next process is the same as the process described in FIG. 1a, so the details related to the process in FIG. 4a will be omitted.

Figure 4B:
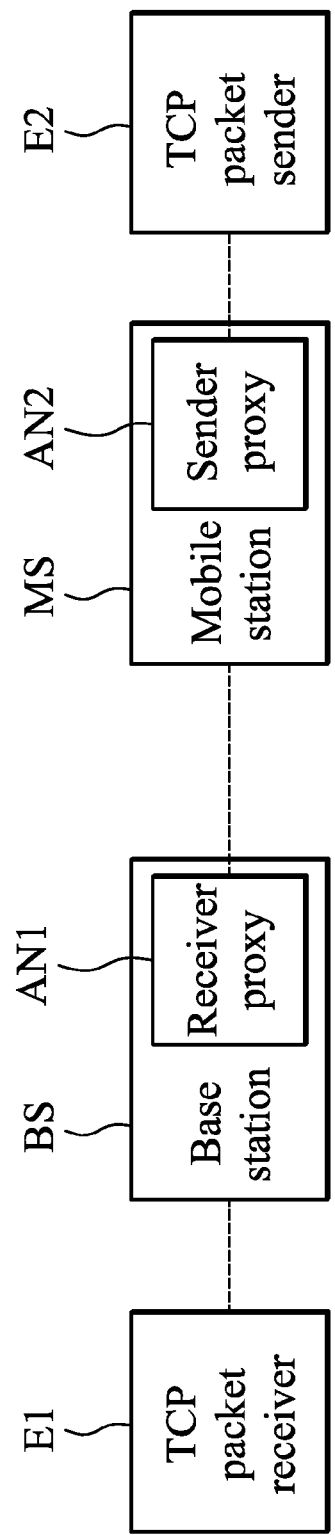

FIG. 4b is a schematic diagram illustrating the communication system according to an embodiment of the present disclosure. The direction of the transmission packets in FIG. 4b is an uplink direction, and the direction of the transmission packets in FIG. 4a is a downlink direction. The process in FIG. 4b is same as the process in FIG. 1a, so the details related to the process in FIG. 4b will be omitted.

Figure 5A:
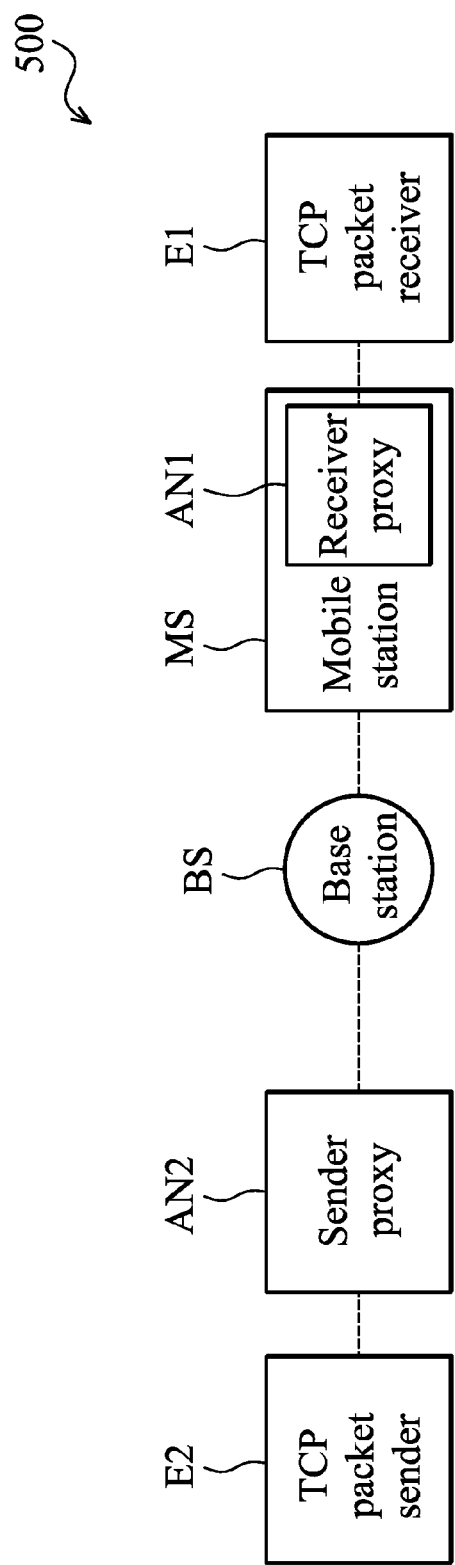
FIGS. 5a and 5b are schematic diagrams illustrating the communication system according to an embodiment of the present disclosure.

FIG. 5a is a schematic diagram illustrating the communication system according to an embodiment of the present disclosure. The communication system 500 comprises a TCP packet receiver E1, a TCP packet sender E2, a sender proxy AN2, a base station BS and a mobile station MS.

The sender proxy AN2 is set between the TCP packet receiver E1 and the TCP packet sender E2. The base station BS and the mobile station MS set between the TCP packet receiver E1 and the sender proxy AN2 are configured to transmit TCP packets. In the embodiment, the receiver proxy AN in FIG. 1a is integrated into the mobile station MS. Therefore, the mobile station MS in FIG. 5a has the function of the receiver proxy AN1 in FIG. 1a. The next process is the same as the process described in FIG. 1a, so the details related to the process in FIG. 5a will be omitted.

Figure 5B:
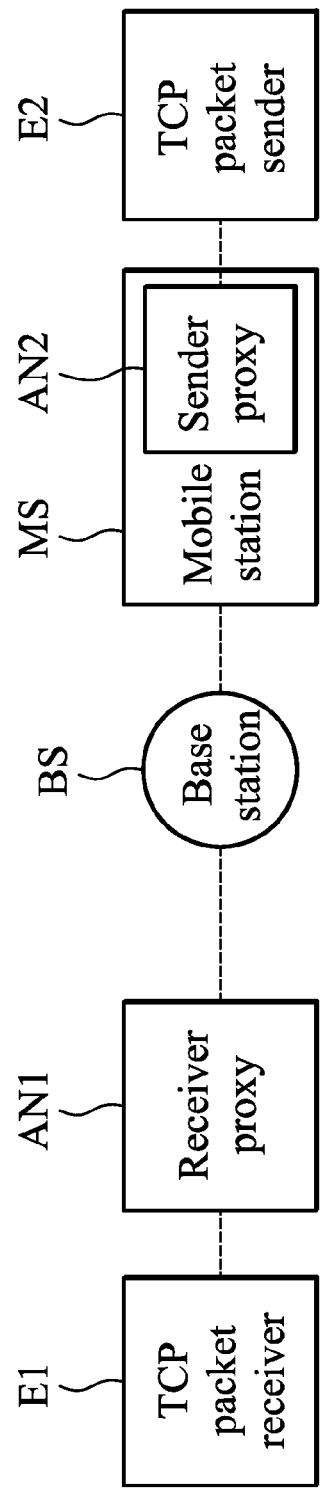

FIG. 5b is a schematic diagram illustrating the communication system according to an embodiment of the present disclosure. The direction of the transmission packets in FIG. 5b is an uplink direction, and the direction of the transmission packets in FIG. 5a is a downlink direction. The process in FIG. 5b is same as the process in FIG. 1a, so the details related to the process in FIG. 5b will be omitted.

Figure 6A:
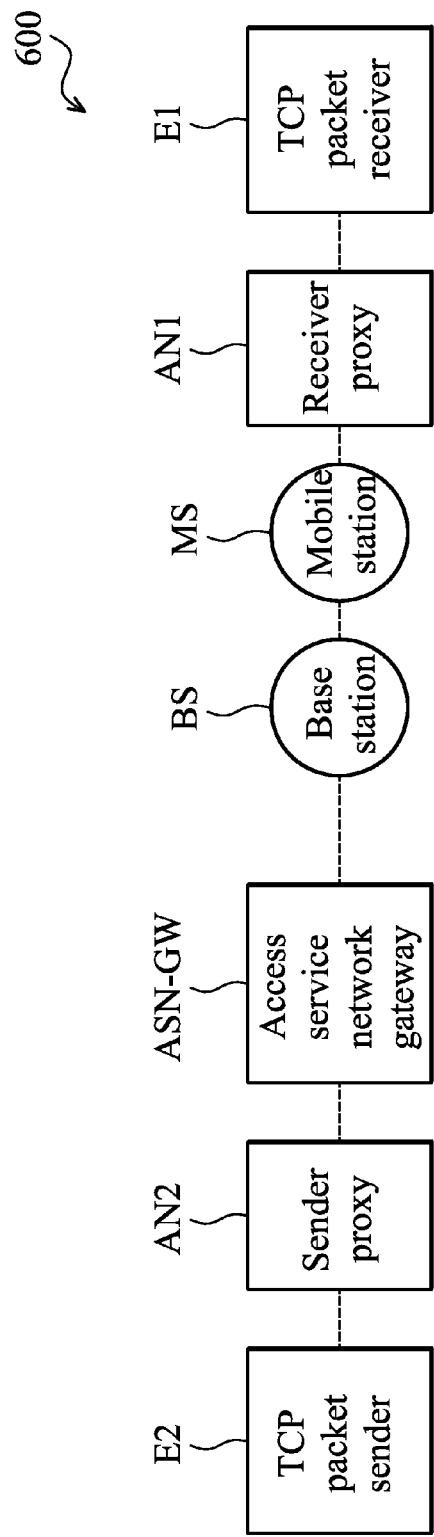
FIGS. 6a and 6b are schematic diagrams illustrating the communication system according to an embodiment of the present disclosure.

FIG. 6a is a schematic diagram illustrating the communication system according to an embodiment of the present disclosure. The communication system 600 comprises a TCP packet receiver E1, a TCP packet sender E2, a receiver proxy AN1, a sender proxy AN2, an access service network gateway (ASN-GW), a base station BS and a mobile station MS.

The receiver proxy AN1 and the sender proxy AN2 are set between the TCP packet receiver E1 and the TCP packet sender E2. The base station BS and the mobile station MS set between the receiver proxy AN1 and the sender proxy AN2 are configured to transmit TCP packets. The access service network gateway is set between the base station BS and the sender proxy AN2, wherein the access service network gateway is configured to connect to multiple base stations. The next process is the same as the process described in FIG. 1a, so the details related to the process in FIG. 6a will be omitted.

Figure 6B:
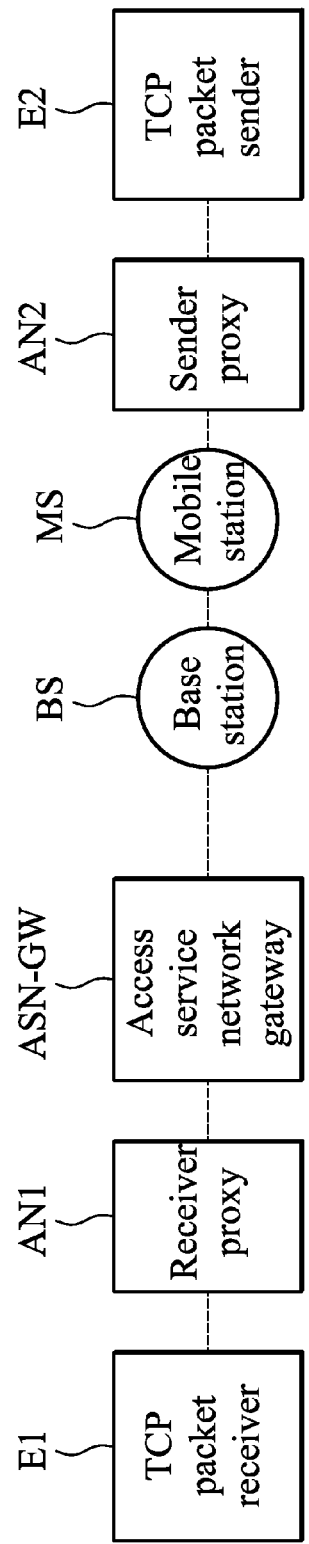

FIG. 6b is a schematic diagram illustrating the communication system according to an embodiment of the present disclosure. The direction of the transmission packets in FIG. 6b is an uplink direction, and the direction of the transmission packets in FIG. 6a is a downlink direction. The process in FIG. 6b is same as the process in FIG. 1a, so the details related to the process in FIG. 6b will be omitted.

Figure 7A:
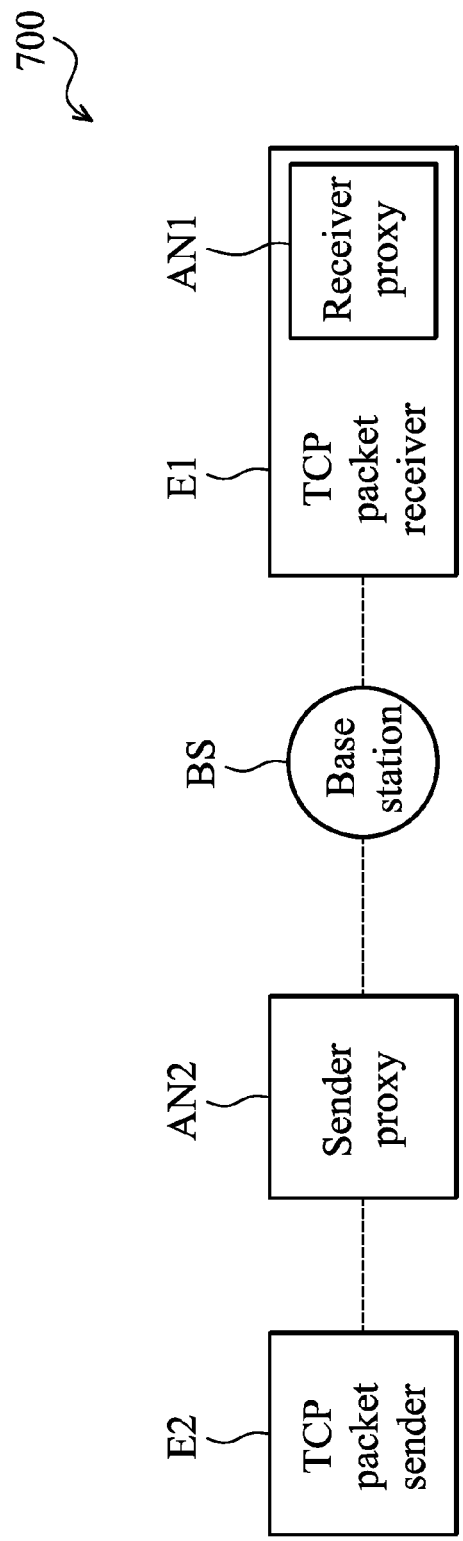
FIGS. 7a and 7b are schematic diagrams illustrating the communication system according to an embodiment of the present disclosure.

FIG. 7a is a schematic diagram illustrating the communication system according to an embodiment of the present disclosure. The communication system 700 comprises a TCP packet receiver E1, a TCP packet sender E2, a sender proxy AN2 and a base station BS.

The sender proxy AN2 is set between the TCP packet receiver E1 and the TCP packet sender E2. The base station BS set between the TCP packet receiver E1 and the sender proxy AN2 is configured to transmit TCP packets. In the embodiment, the receiver proxy AN1 in FIG. 1a and the mobile station MS (not shown in FIG. 7a) are integrated into the TCP packet receiver E1. Therefore, the TCP packet receiver E1 in FIG. 7a has the function of the receiver proxy AN1 and the mobile station MS in FIG. 1a. The next process is the same as the process described in FIG. 1a, so the details related to the process in FIG. 7a will be omitted.

Figure 7B:
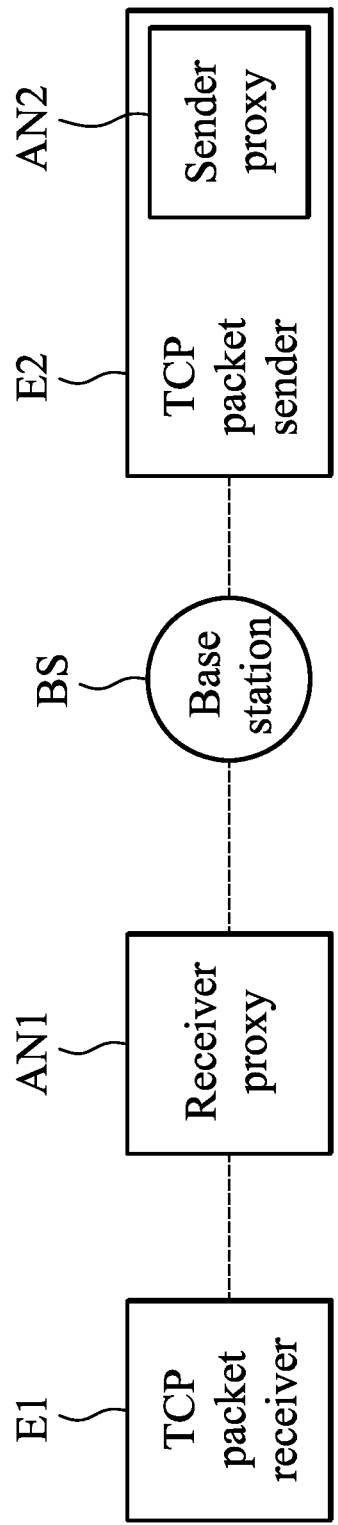

FIG. 7b is a schematic diagram illustrating the communication system according to an embodiment of the present disclosure. The direction of the transmission packets in FIG. 7b is an uplink direction, and the direction of the transmission packets in FIG. 7a is a downlink direction. The process in FIG. 7b is same as the process in FIG. 1a, so the details related to the process in FIG. 6b will be omitted. In one embodiment, the receiver proxy AN1, the sender proxy AN2, the TCP packet receiver E1 and the TCP packet sender E2 can be used to transmit and receive the TCP packets.

Figure 8:
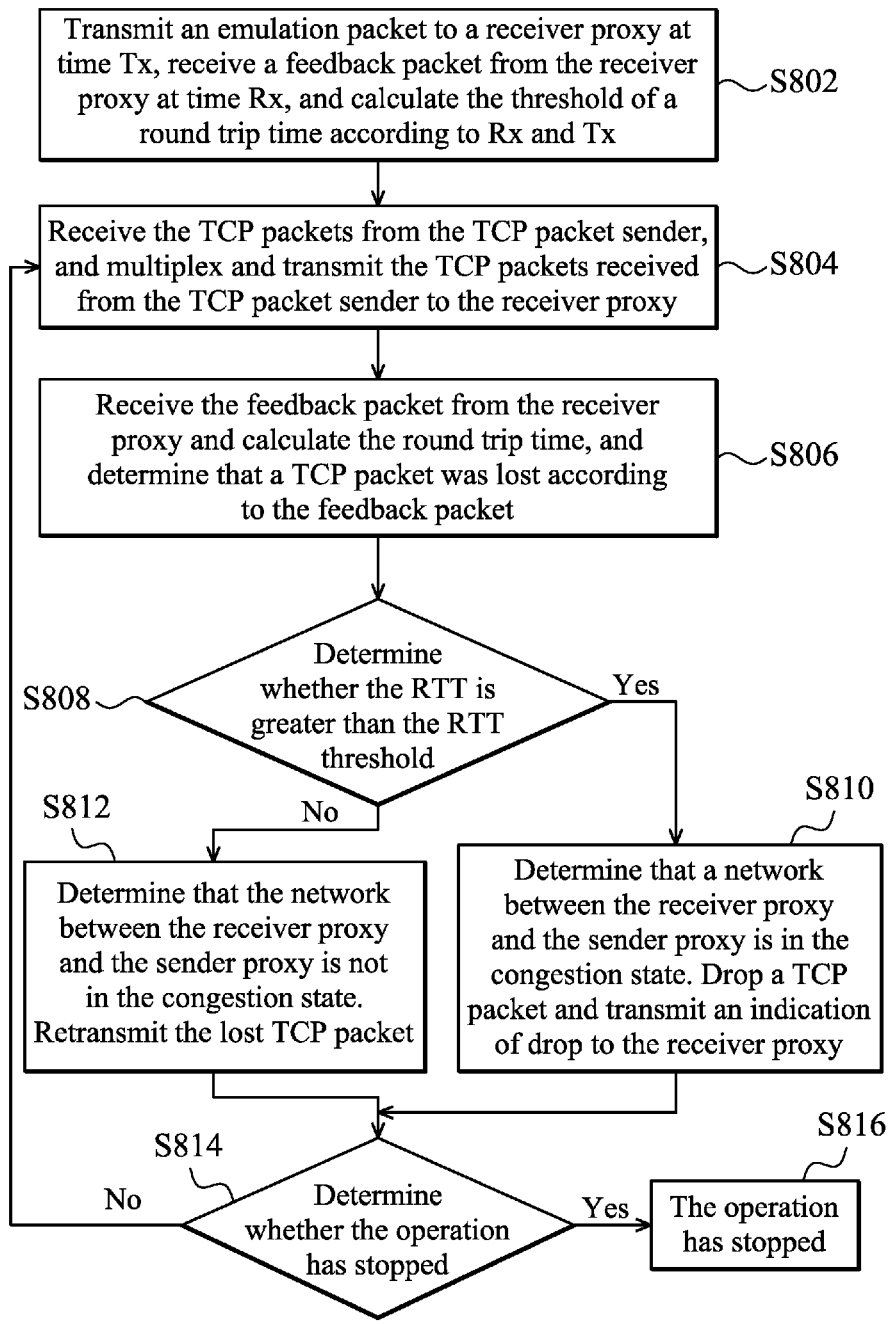
FIG. 8 is a flow diagram illustrating the method for assisting with the transmission of TCP packets according to an embodiment of the present disclosure.

FIG. 8 is a flow diagram illustrating the method for assisting with the transmission of TCP packets according to an embodiment of the present disclosure. In step S802, an emulation packet is transmitted to a receiver proxy at time Tx, a feedback packet is received from the receiver proxy at time Rx, and the round trip time threshold (RTT threshold) is calculated according to Rx and Tx. In step S804, the TCP packets are received from the TCP packet sender, and the TCP packets received from the TCP packet sender are multiplexed and transmitted to the receiver proxy. In step S806, the feedback packet is received from the receiver proxy and the round trip time is calculated, and it is determined that a TCP packet was lost according to the feedback packet. In step S808, it is determined whether the RTT is greater than the RTT threshold. When the RTT is greater than the RTT threshold, step S810 is executed. When the RTT is not greater than the RTT threshold, step S812 is executed. In step S810, it is determined that a network between the receiver proxy and the sender proxy is in a congestion state. A TCP packet is dropped by the sender proxy and an indication of drop is transmitted to the receiver proxy. In step S812, it is determined that the network between the receiver proxy and the sender proxy is not in the congestion state. The lost TCP packet is retransmitted. In step S814, it is determined whether the operation has stopped. When it is determined that the operation has stopped, step S816 is executed and the operation is stopped. When it is determined that the operation has not stopped, step S804 is once again executed.

Figure 9:
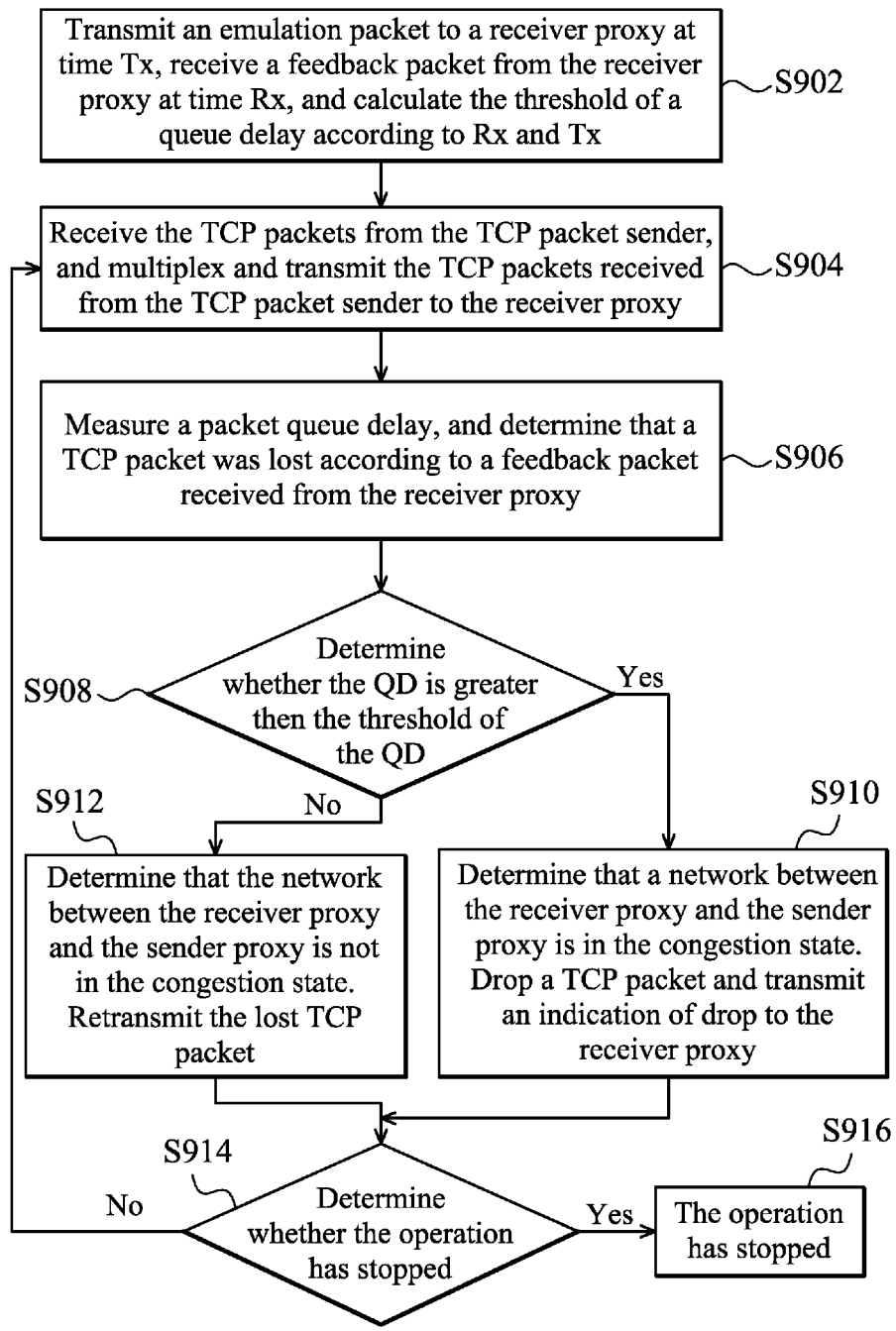
FIG. 9 is a flow diagram illustrating the method for assisting with the transmission of TCP packets according to another embodiment of the present disclosure.

FIG. 9 is a flow diagram illustrating the method for assisting with the transmission of TCP packets according to an embodiment of the present disclosure. In step S902, an emulation packet is transmitted to a receiver proxy at time Tx, a feedback packet is received from the receiver proxy at time Rx, and the threshold of a packet queue delay is calculated according to Rx and Tx. In step S904, the TCP packets are received from the TCP packet sender, and the TCP packets received from the TCP packet sender are multiplexed and transmitted to the receiver proxy. In step S906, a packet queue delay is measured, and it is determined that a TCP packet was lost according to a feedback packet received from the receiver proxy. In step S908, the packet queue delay is compared with the threshold of the packet queue delay, and it is determined whether the packet queue delay is greater than the threshold of the packet queue delay. When the packet queue delay is greater than the threshold of the packet queue delay, step S910 is executed. When the packet queue delay is not greater than the threshold of the packet queue delay, step S912 is executed. In step S910, it is determined that a network between the receiver proxy and the sender proxy is in a congestion state. A TCP packet is dropped and an indication of drop is transmitted to the receiver proxy. In step S912, it is determined that the network between the receiver proxy and the sender proxy is not in the congestion state. The lost TCP packet is retransmitted. In step S914, it is determined whether the operation has stopped. When it is determined that the operation has stopped, step S916 is executed and the operation is stopped. When it is determined that the operation has not stopped, step S904 is once again executed.

Figure 10:
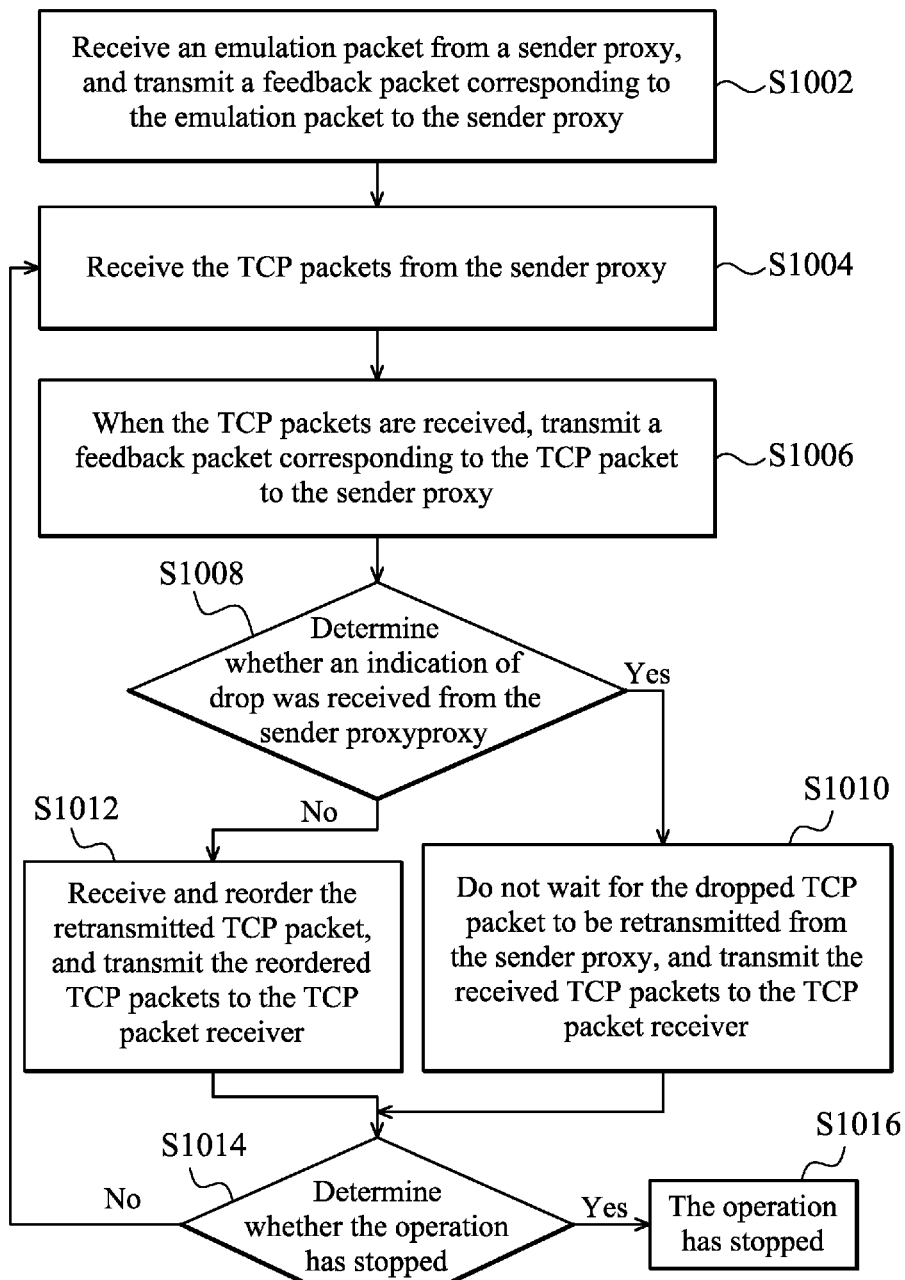
FIG. 10 is a flow diagram illustrating the method for assisting with the transmission of TCP packets according to an embodiment of the present disclosure.

FIG. 10 is a flow diagram illustrating the method for assisting with the transmission of TCP packets according to an embodiment of the present disclosure. In step S1002, an emulation packet is received from a sender proxy, and a feedback packet corresponding to the emulation packet is transmitted to the sender proxy. In step S1004, the TCP packets are received from the sender proxy. In step S1006, when the TCP packets are received, a feedback packet corresponding to the TCP packet is transmitted to the sender proxy. In step S1008, it is determined whether an indication of drop was received from the sender proxy. When the indication of drop has received from the sender proxy, step S1010 is executed. When the indication of drop has not been received from the sender proxy, step S1012 is executed. In step S1010, the receiver proxy does not wait for the dropped TCP packet to be retransmitted from the sender proxy and the received TCP packets are transmitted to the TCP packet receiver. In step S1012, the retransmitted TCP packets are received and reordered, and the reordered TCP packets are transmitted to the TCP packet receiver. In step S1014, it is determined whether the operation has stopped. When it is determined that the operation has stopped, step S1016 is executed and the operation is stopped. When it is determined that the operation has not stopped, the step returns to step S1004.

The proxy pair system and method proposed in the present disclosure can resolve problems where wireless link usage efficiency is low because the TCP misjudged the congestion state in wrong wireless link transmission. The system and method can achieve higher transmission efficiency and maintain lower delay. In addition, the present disclosure does not require new features of other devices, and can provide advantages of low cost integration.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that and aspect disclosed herein may be implemented independently of any other aspects and that two or more of these aspects may be combined in various ways.

While the disclosure has been described in connection with various aspects, it will be understood that the disclosure is capable of further modifications. This application is intended to cover any variations, uses or adaptation of the disclosure following, in general, the principles of the disclosure, and including such departures from the present disclosure as come within the known and customary practice within the art to which the disclosure pertains.

What is claimed is:

1. A communication system, which is used in a wireless communication link, comprising:
   a receiver proxy; and
   a sender proxy:
   receiving a plurality of TCP packets from a TCP packet sender and transmit the TCP packets to the receiver proxy;
   calculating a round trip time (RTT) between the sender proxy and the receiver proxy when receiving a feedback packet from the receiver proxy, and comparing a RTT threshold and the RTT between the sender proxy and the receiver proxy;
   determining whether a network between the sender proxy and the receiver proxy is in a congestion state according to the result of the comparison between the RTT threshold and the RTT;
   dropping a TCP packet when the network is in the congestion state; and
   retransmitting a lost TCP packet to the receiver proxy when the network is not in the congestion state,
   wherein the receiver proxy receives the TCP packets from the sender proxy, and transmits the feedback packet to the sender proxy after receiving the TCP packets, and the sender proxy and the receiver proxy are configured between the TCP packet sender and a TCP packet receiver,
   wherein when the network is not in the congestion state, the receiver proxy receives the lost TCP packet retransmitted by the sender proxy, and reorders the TCP packets, and the receiver proxy transmits the received TCP packets to the TCP packet receiver after reordering the TCP packets.

2. The communication system as claimed in claim 1, further comprising:
   a base station (BS) and a mobile station (MS), wherein the base station and the mobile station are configured between the sender proxy and the receiver proxy.

3. The communication system as claimed in claim 1, further comprising:
   an access service network gateway (ASN-GW), configured between the sender proxy and the receiver proxy.

4. The communication system as claimed in claim 1, wherein the sender proxy is integrated in a base station or a mobile station.

5. The communication system as claimed in claim 1, wherein the receiver proxy is integrated in a mobile station or a base station.

6. The communication system as claimed in claim 1, wherein when the network is in the congestion state, the sender proxy further transmits an indication of drop to the receiver proxy which indicates that the sender proxy has dropped the TCP packet.

7. The communication system as claimed in claim 1, wherein the RTT threshold is calculated according to a link delay between the receiver proxy and the sender proxy.

8. The communication system as claimed in claim 1, wherein the congestion state is determined when the sender proxy determines that the RTT is greater than the RTT threshold.

9. The communication system as claimed in claim 1, wherein the sender proxy calculates a threshold of a packet queue delay according to a link delay between the receiver proxy and the sender proxy.

10. The communication system as claimed in claim 9, wherein the congestion state is determined when the sender proxy determines that the packet queue delay is greater than the threshold of the packet queue delay.

11. A communication system, which is used in a wireless communication link, comprising;
    a TCP packet sender; and
    a sender proxy:
    receiving a plurality of TCP packets from the TCP packet sender and transmit the TCP packets to a receiver proxy;
    calculating a round trip time (RTT) between the sender proxy and the receiver proxy when receiving a feedback packet from the receiver proxy, and comparing a RTT threshold and the RTT between the sender proxy and the receiver proxy;
    determining whether a network between the sender proxy and the receiver proxy is in a congestion state according to the result of the comparison between the RTT threshold and the RTT;
    dropping a TCP packet when the network is in the congestion state and transmitting an indication of drop to inform the receiver proxy that the receiver proxy does not need to wait for the dropped TCP packet to be retransmitted from the sender proxy,
    wherein the sender proxy and the receiver proxy are configured between the TCP packet sender and a TCP packet receiver,
    wherein when the network is not in the congestion state, the receiver proxy receives the lost TCP packet retransmitted by the sender proxy, and reorders the TCP packets, and the receiver proxy transmits the received TCP packets to the TCP packet receiver after reordering the TCP packets.

12. The communication system as claimed in claim 11, further comprising:
    a base station (BS) and a mobile station (MS), wherein the base station and the mobile station are configured between the sender proxy and the receiver proxy.

13. The communication system as claimed in claim 11, further comprising:
    an access service network gateway (ASN-GW), configured between the sender proxy and the receiver proxy.

14. The communication system as claimed in claim 11, wherein the sender proxy is integrated in a base station or a mobile station.

15. The communication system as claimed in claim 11, wherein the congestion state is determined when the sender proxy determines that the RTT is greater than the RTT threshold.

16. The communication system as claimed in claim 11, wherein the sender proxy calculates a threshold of a packet queue delay according to a link delay between the receiver proxy and the sender proxy.

17. The communication system as claimed in claim 16, wherein the congestion state is determined when the sender proxy determines that the RTT is greater than the RTT threshold.

18. The communication system as claimed in claim 11, wherein when the network is not in the congestion state and the sender proxy determines that a TCP packet was lost according to the feedback packet from the receiver proxy, the sender proxy retransmits the lost TCP packet to the receiver proxy.

19. A communication system, which is used in a wireless communication system, comprising;
a TCP packet receiver; and
a receiver proxy:
receiving a plurality of TCP packets from a TCP packet sender;
transmitting a feedback packet to a sender proxy when receiving a TCP packet; and
receiving an indication of drop, indicating that the sender proxy has dropped a TCP packet transmitted from the sender proxy and transmitted the received TCP packets to the TCP packet receiver;
wherein the indication of drop is used to inform the receiver proxy that the receiver proxy does not need to wait for the dropped TCP packet to be retransmitted from the sender proxy, and the sender proxy and the receiver proxy are configured between the TCP packet sender and the TCP packet receiver,
wherein when the network is not in the congestion state, the receiver proxy receives a lost TCP packet retransmitted by the sender proxy, and reorders the TCP packets, and the receiver proxy transmits the received TCP packets to the TCP packet receiver after reordering the TCP packets.

20. The communication system as claimed in claim 19, wherein a mobile station is configured between the sender proxy and the receiver proxy.

21. The communication system as claimed in claim 19, wherein the receiver proxy is integrated in a mobile station.

22. A method for assisting with the transmission of TCP packets, which is used in a wireless communication link, comprising:
receiving, by a sender proxy, a plurality of TCP packets from a TCP packet sender and transmitting the TCP packets to a receiver proxy;
transmitting, by a receiver proxy, a feedback packet to a sender proxy when receiving a TCP packet;
calculating, by the sender proxy, a round trip time (RTT) between the sender proxy and the receiver proxy when receiving the feedback packet, and comparing a RTT threshold and the RTT between the sender proxy and receiver proxy;
determining, by the sender proxy, whether a network between the sender proxy and the receiver proxy is in a congestion state according to the result of the comparison between the RTT threshold and the RTT;
dropping, by the sender proxy, a TCP packet when the network is in the congestion state;
retransmitting, by the sender proxy, a lost TCP packet to the receiver proxy when the network is not in the congestion state; and
receiving, by the receiver proxy, the lost TCP packets retransmitted by the sender proxy when the network is not in the congestion state, wherein the TCP packets are reordered.

23. The method as claimed in claim 22, wherein the congestion state is determined when the RTT is greater than the RTT threshold.

24. The method as claimed in claim 22, further comprising:
transmitting, by the sender proxy, an indication of drop, indicating that the sender proxy has dropped the TCP packet to inform the receiver proxy when the network is in the congestion state.

25. A method for assisting with the transmission of TCP packets, which is used in a wireless communication link, comprising:
receiving, by a sender proxy, a plurality of TCP packets from a TCP packet sender and transmitting the TCP packets to a receiver proxy;
calculating, by the sender proxy, a round trip time (RTT) between the sender proxy and the receiver proxy when receiving a feedback packet from the receiver proxy, and comparing a RTT threshold and the RTT between the sender proxy and receiver proxy;
determining, by the sender proxy, whether a network between the sender proxy and the receiver proxy is in a congestion state according to the result of the comparison between the RTT threshold and the RTT;
dropping, by the sender proxy, a TCP packet when the network is in the congestion state; and
receiving, by the receiver proxy, the TCP packet retransmitted by the sender proxy when the network is not in the congestion state, wherein the TCP packets are reordered.

26. The method as claimed in claim 25, further comprising:
determining, by the sender proxy, that a TCP packet was lost according to a feedback packet from the receiver proxy, and retransmitting a lost TCP packet to the receiver proxy when the network is not in the congestion state.

27. The method as claimed in claim 25, further comprising:
transmitting, by the sender proxy, an indication of drop, indicating that the sender proxy has dropped the TCP packet to inform the receiver proxy when the network is in the congestion state.

28. The method as claimed in claim 25, wherein the congestion state is determined when the RTT is greater than the RTT threshold.

29. A method for assisting with the transmission of TCP packets, which is used in a wireless communication link, comprising:
receiving, by a receiver proxy, a plurality of TCP packets from a sender proxy;
transmitting, by the receiver proxy, a feedback packet to the sender proxy when receiving a TCP packet;
receiving, by the receiver proxy, an indication of drop, indicating that the sender proxy has dropped a TCP packet;
receiving, by the receiver proxy, a lost TCP packet retransmitted by the sender proxy when the network is not in the congestion state, and reordering the TCP packets; and
transmitting, by the receiver proxy, the received TCP packets to a TCP packet receiver after reordering the TCP packets,
wherein the indication of drop is used to inform the receiver proxy that the receiver proxy does not need to wait for the dropped TCP packet to be retransmitted from the sender proxy.

* * * * *